United States Patent [19]

Rossi

[11] 4,050,084

[45] Sept. 20, 1977

[54] COMB FILTER FOR TELEVISION SIGNALS HAVING ADAPTIVE FEATURES

[75] Inventor: John P. Rossi, New York, N.Y.

[73] Assignee: CBS Inc., New York, N.Y.

[21] Appl. No.: 705,204

[22] Filed: July 14, 1976

[51] Int. Cl.² ............................................. H04N 9/535
[52] U.S. Cl. ........................................................ 358/31
[58] Field of Search ............................................ 358/31

[56] References Cited

U.S. PATENT DOCUMENTS 3,895,393  7/1975  Drummond et al. .................. 358/31

Primary Examiner—John C. Martin
Attorney, Agent, or Firm—Spencer E. Olson

[57] ABSTRACT

A comb filter system for the separation of the luminance and chrominance components of an NTSC color television signal which analyzes the video signal on the television lines and detects luminance or color transistions in the vertical direction, and in response to the presence of one or both of such transitions, automatically either modifies or removes the comb filter, to minimize transient distortions in the reconstructed television picture. The system can be implemented in either the analog domain or the digital domain.

7 Claims, 1 Drawing Figure

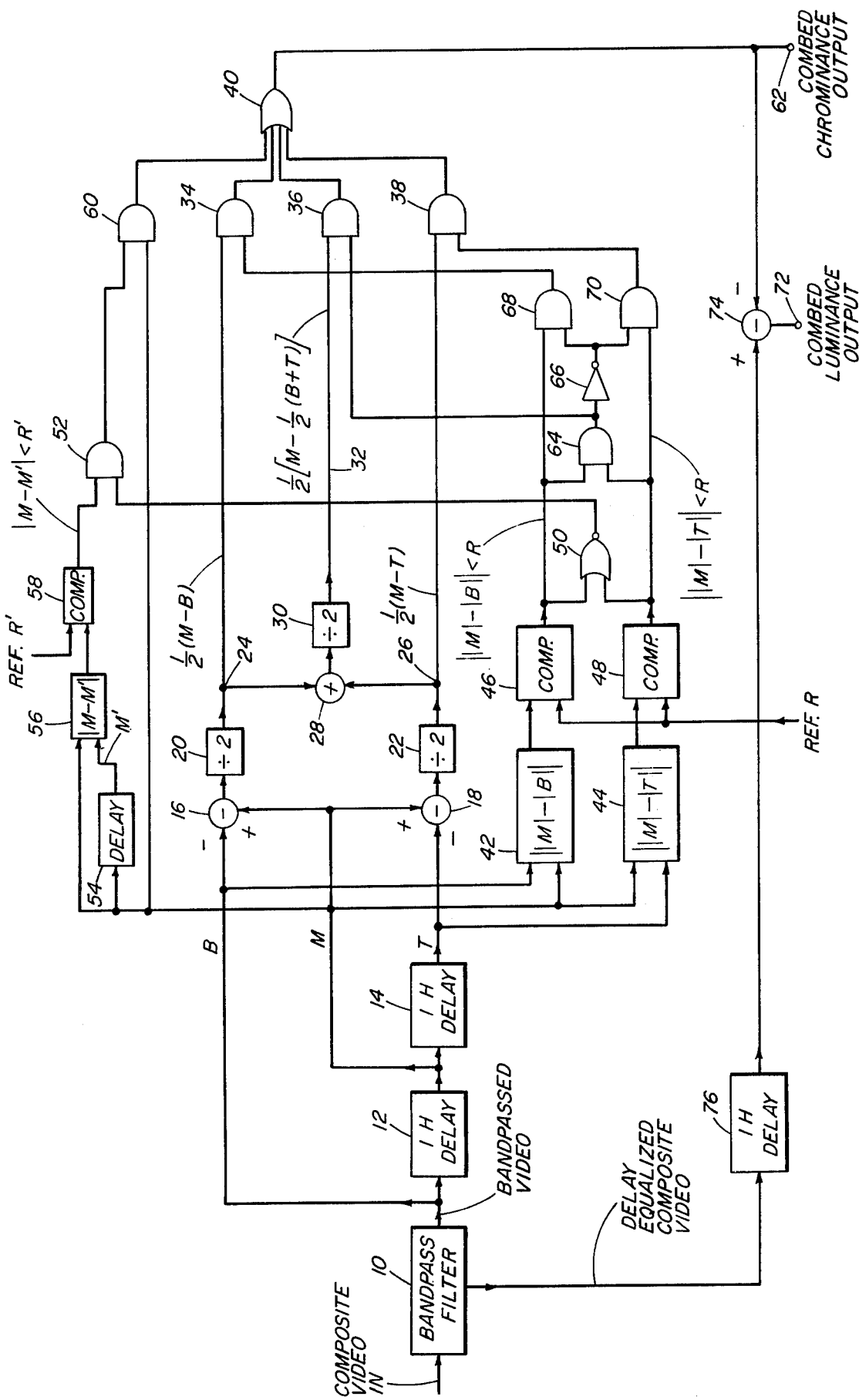

COMB FILTER FOR TELEVISION SIGNALS HAVING ADAPTIVE FEATURES

BACKGROUND OF THE INVENTION

This invention relates generally to television apparatus and, more particularly, to apparatus for the separation of the luminance and chrominance components of an NTSC color television signal.

During the past few years there has been an increasing use of delay-line comb filters for the separation of the luminance and chrominance components of an NTSC encoded signal. This technique, capable of producing full band luminance output to the limit of the input signal bandwidth, is based upon the assumption that above a frequency of about 2.5 MHz negligble video changes in the vertical picture plane occur over any three successive television lines. When that assumption fails, as it frequently does with program video, certain picture anomalies occur as a result of imperfect cancellation of chrominance in the luminance output signal, and vice versa. The condition of spurious chroma in the luminance output has been observed to be the more serious problem as it gives rise to objectionable scintillating serrations along horizontal edges of surfaces where sudden hue or saturation changes exist. When a delay-line comb filter is used for freeze-frame display, this edge effect becomes visible as a 15Hz edge flicker because of the frame-rate inversions of chrominance required for that mode of operation.

Both manifestations can be substantially minimized if the uncancelled or spurious chrominance can be deleted from the luminance signal. A known system for accomplishing this utilizes a detection circuit capable of determining when chrominance transitions are occurring in the vertical direction, and when such transitions are detected a gating signal is generated which causes the luminance signal to be suitably filtered to eliminate the spurious chrominance that would otherwise have appeared in the luminance signal. The gated filtering of the chrominance is controlled by a manually adjustable threshold setting so that chrominance deletion can be utilized at as low a chrominance differential level as is permitted by the signal-to-noise ratio. This system implemented in the analog domain, has operated satisfactorily in actual video operations. However, since in this system the 3.58 MHz luminance signal is subjected to low-pass filtering after the spurious chrominance has occurred, there is a possibility of luminance detail being obscured or eliminated in the filtered signal so as to degrade the reconstructed television picture when the filtered luminance and chrominance components are recombined in the color decoder.

Although delay-line comb filters implemented in the analog domain for separation of the luminance and chrominance components of an NTSC color television signal have been developed to a high standard of performance, it is generally recognized that in the future an increasing percentage of television broadcasting plant processing will be performed digitally. At present, color encoding and decoding in the digital domain are relatively costly operations because arithmetic operations must be performed at high speeds that tax the capability of existing logic hardware. However, as digital circuits and stores become faster and less expensive, the concept of digital processing becomes increasingly practical and attractive.

A recent development in digital television equipment is a device known as the "Electronic Still Store" wherein an NTSC color television signal is generated from a magnetically stored pulse code modulated (PCM) video frame. Because of the characteristics of the NTSC color television signal, in order to generate a correct signal from a single stored frame, it is necessary to separate the luminance and chrominance components, invert the chrominance component on alternate frames, and then recombine the two signals. Care must therefore be taken to avoid any luminance energy from getting into the chrominance channel where it will undergo an inversion on alternate frames and generate a disturbing 15 Hz flicker in the reconstructed television picture. It is important, therefore, that a clean separation of chrominance and luminance components be performed.

As has been noted above, separation of the luminance and chrominance components of an NTSC color television signal is best accomplished by comb filtering techniques, which take advantage of the frequency relationship between the horizontal line rate and the color subcarrier signal. A typical comb filter utilizes three adjacent television lines in a given field and selectively adds and subtracts them to obtain the chrominance and luminance signals. If three sequential television lines are labeled "Top" (T), "Middle" (M) and "Bottom" (B), a comb filter using one of the following algorithms may be used to separate chrominance (C) and luminance (Y) within the chrominance passband:

$$C = \tfrac{1}{2}[M - \tfrac{1}{2}(T+B)] \text{ and } Y = \tfrac{1}{2}[M + \tfrac{1}{2}(T+B)] \qquad [1]$$

$$C = \tfrac{1}{2}(M-T) \text{ and } Y = \tfrac{1}{2}(M+T) \qquad [2]$$

$$C = \tfrac{1}{2}(M-B) \text{ and } Y = \tfrac{1}{2}(M+B) \qquad [3]$$

An examination of the function of these algorithms reveals that the comb filter effectively operates by sampling and averaging, with particular weighting coefficients, three picture elements from three adjacent lines in the case of algorithm (1), and two picture elements from two adjacent lines in the case of algorithms (2) and (3). Algorithm (1) is desirably used whenever the chrominance or the luminance on the television lines being combined are reasonably constant. However, if the television picture should contain a luminance or a color transition in the vertical direction, algorithm (1) will generate a disturbing transient in the reconstructed television picture. Accordingly, there is a need for an automatic adaptive comb filter capable of detecting such vertical transitions and in response thereto to utilize algorithm (2) or (3), or to bypass the comb filter, to minimize the transient distortions.

The primary object of the present invention is to provide in comb filter apparatus a solution to this need, thereby to improve the quality of television displays.

SUMMARY OF THE INVENTION

This and other objects are accomplished by providing a comb filter which employs delay lines to separate an NTSC band-passed video signal into a main (M) line component and two adjacent line components (T) and (B), and a logic system which is operative to detect luminance or color transitions in the vertical direction and in response thereto to select a filtering algorithm most desirable for minimizing transient distortions. More specifically, the system includes means for subtracting the (B) signal from the (M) signal and for subtracting the (T) signal from the (M) signal and for adding together a suitable fraction of each of the difference signals to produce a chrominance output (C) if the signal content of both (T) and (B) is approximately the same as the signal content of signal (M); thus, $$C = \tfrac{1}{2}[M - \tfrac{1}{2}(T+B)]$$

The combed luminance output is derived by subtracting the combed chrominance signal from the composite input video signal delayed by one line, so that under the condition specified, the luminance signal is, $$Y = \tfrac{1}{2}[M + \tfrac{1}{2}(T+B)]$$

Means are also provided for subtracting the absolute value of the B signal from the absolute value of the M signal, for subtracting the absolute value of the T signal from the absolute value of the M signal, and for comparing the absolute values of each of these difference signals to a reference signal. If the comparison shows that the signal content of T is approximately the same as the signal content of M, but different from the signal content of B, i.e., $||M|-|T|| \leq$ Reference and $||M|-|B|| >$ Reference, then the system automatically changes to use the algorithm, $$C = \tfrac{1}{2}(M-T)$$

$$Y = \tfrac{1}{2}(M+T)$$

Further, if the comparison indicates that the signal content of M is substantially that of B, but different from the signal content of T, i.e., $||M|-|B|| >$ Reference and $||M|-|T|| \leq$ Reference, then the system automatically changes to use the algorithm, $$C = \tfrac{1}{2}(M-B)$$

$$Y = \tfrac{1}{2}(M+B)$$

If the comparison shows that the signal content is different in all three of the T, M and B signals, the system makes a determination as to whether the M line contains a chrominance transition or a luminance transition based on the assumption that it is a chrominance transition if video samples of M, taken one color subcarrier period apart, have approximately the same amplitude; that is, their absolute difference is less than the amplitude of a predetermined reference signal. In that case, the logic is operative to cause the chrominance output to be equal to M and the luminance output to be zero; otherwise, the chrominance output is zero and the luminance output is equal to M.

The system according to the invention can be implemented in either the analog domain or the digital domain, the choice depending on the system application in which its use is intended.

BRIEF DESCRIPTION OF THE DRAWINGS

Other Objects, features and advantages of the invention will become apparent, and its construction and operation better understood from the following detailed description, taken in conjunction with the accompanying drawing, the single FIGURE of which is a logic and block diagram of an automatic adaptive comb filter in accordance with the invention.

DESCRIPTION OF THE PREFERRED EMBODIMENT

In the illustrated system, the logic and block diagram of which is equally representative of an analog or a digital implementation, the NTSC video signal is applied to a bandpass filter 10 having a passband of from about 2.1 MHz to 4.2 MHz, and the bandpassed video, which includes the chrominance signal and high frequency luminance, is applied to the input terminal of a delay line 12 which delays the signal for a period of 63.5 microseconds or one horizontal line. The delayed signal at the output of delay line 12 is applied to the input terminal of a second delay line 14, which introduces another delay of 63.5 microseconds or one horizontal line. The described time delays cause three adjacent line components of the chrominance signal to be aligned with respect to time: the once-delayed component of the signal at the output of delay line 12 becomes the middle or main (M) component, the twice-delayed component at the output of delay line 14 becomes what is typically termed the "top" (T) component, and the undelayed component at the output of filter 10 is known as the "bottom" (B) component.

A comb filter using one of the following algorithms can be used to separate the chrominance component (C) and the luminance component (Y) within the bandpassed video signal:

$$C = \tfrac{1}{2}[M - \tfrac{1}{2}(T+B)] \text{ and } Y = \tfrac{1}{2}[M + \tfrac{1}{2}(T+B)] \quad [1]$$

$$C = \tfrac{1}{2}(M-T) \text{ and } Y = \tfrac{1}{2}(M+T) \quad [2]$$

$$C = \tfrac{1}{2}(M-B) \text{ and } Y = \tfrac{1}{2}(M+B) \quad [3]$$

It is the function of the logic now to be described to select automatically, depending on the content of the applied composite video signal, the algorithm most appropriate for processing the chrominance component, or none of them under certain signal conditions. Generally stated, the logic provides five choices for the chrominance output signal: the chrominance output signal may be in accordance with either of algorithms (1), (2) or (3), or it may be an uncombed line signal, the main (M) signal, or no signal at all; the one most appropriate for the signal conditions prevailing at any given instant in time is automatically selected. To enable selection of an operating mode from among algorithms (1), (2) and (3), it is necessary to derive from the bandpassed video the chrominance components $\tfrac{1}{2}[M - \tfrac{1}{2}(B+T)]$, $\tfrac{1}{2}(M-T)$ and $\tfrac{1}{2}(M-B)$. To this end, the line B is subtracted from line M in a subtracting junction 16, the line T is subtracted from line M in a subtracting junction 18, the amplitudes of the two difference signals are each reduced by one-half in respective ratio circuits 20 and 22, thereby to produce the signals $\tfrac{1}{2}(M-B)$ and $\tfrac{1}{2}(M-T)$ on lines 24 and 26, respectively. The signals on lines 24 and 26 are added together in a summing junction 28, and the sum signal is reduced in amplitude by a factor of two in a ratio circuit 30, thereby to produce on line 32 a signal $\tfrac{1}{2}[M - \tfrac{1}{2}(B+T)]$, which corresponds to the chrominance component C in algorithm (1). The signals appearing on lines 24, 32 and 26 are applied as one input of AND gates 34, 36 and 38, respectively. The output terminals of these AND gates are connected one each to one of three of the four input terminals of an OR gate 40; which of the signals applied to the said one input of gates 34, 36 and 38, if any, is applied to the OR gate 40 depends on the nature of the signals applied to the second input of the AND gates, the derivation of which will now be described.

If the signal content of both T and B is approximately the same as the signal content of M, i.e., $|T| \simeq |M| \simeq |B|$ (where the absolute value is used to take care of the 180° chrominance phase difference on adjacent television lines in the NTSC system), then $C = \frac{1}{2}[M - \frac{1}{2}(T+B)]$, corresponding to algorithm (1). Stated another way, it is desirable to use algorithm (1) whenever the chrominance or the luminance on the television lines being combined is reasonably constant. However, if the television picture contains a luminance or color transition in the vertical direction, if algorithm (1) is used a disturbing transient will be generated which could be minimized by using a different algorithm or by-passing the comb filter altogether. If the absolute values of T and M are approximately equal, but are not approximately equal to the absolute value of B, i.e., $|T| \simeq |M| \neq |B|$, then algorithm (2) is most effective in minimizing transients, whereas if $|T| \neq |M| \simeq |B|$, them algorithm (3) is to be preferred. Thus, selection of the appropriate algorithm, or a decision not to use any of them, requires a comparison of the absolute values of the T, M and B signals.

To this end, the B and M signals are applied as input signals to a circuit 42 which is operative to subtract the absolute value of B from the absolute value of M, and the T and M signals are applied to a similar circuit 44 which subtracts the absolute value of T from the absolute value of M. Circuitry for accomplishing this function in either the analog or the digital domain is known; its nature will be briefly described later. The absolute value of the difference signal, if any, from circuit 42 is applied as one input to a comparator 46, and the absolute value of the difference signal, if any, from circuit 44 is applied as one input to a second comparator 48, and a reference signal R is applied as a second input to each of the comparators 46 and 48. The comparators may take the form of a differential amplifier, and the value of R is empirically determined as a function of the signal-to-noise ratio of the input video signal and the amplitude of the difference signals produced by circuits 42 and 44. The value of the reference signal R is manually adjustable and is made as low as permitted by the signal-to-noise ratio.

The outputs of the comparators 46 and 48 are applied as first and second inputs, respectively, to a NOR gate 50; if the absolute difference of the absolute value of M minus the absolute value of B is not less than the value of R, and the absolute difference of the absolute value of M minus the absolute value of T is not less than R, indicating that $|T| \neq |M| \neq |B|$, then there is a true or 1 output from NOR gate 50. This "up" signal, if present, is applied as one input to an AND gate 52 along with another signal derived from a determination of whether the fact that the absolute value of M is greater than the absolute value of both B and T is due to a chrominance transition or to a luminance transition. The system logic is based on the assumption that it is due to a chrominance transition if video samples of M, taken a color subcarrier apart (i.e., 279 ns) have approximately the same amplitude. Thus, the M signal appearing at the output of delay line 12 is applied to a delay line 54 which delays the M signal by one period of the color subcarrier, and the delayed signal, identified as M', is applied as one input and the undelayed M signal is applied as a second input to a circuit 56 which is operative to subtract the signal M' from the signal M. The absolute difference signal from circuit 56, if any, is applied as one input to a comparator 58, which may be a differential amplifier, to which a reference signal R' is applied as a second input. The amplitude of the reference signal is manually adjustable to as low a value as is permitted by the signal-to-noise ratio of the applied video signal. If the absolute value of the difference signal from comparator 58 is less than R', indicating that M is a chrominance signal, a positive signal is applied to the second input of AND gate 52, and if at the same time there is a positive input from NOR gate 50 at the first input, there is a positive output from AND gate 52. On the other hand, if the absolute value of the difference signal is greater than R', there is no output from AND gate 52, even if there is a positive signal at its first input. The positive output signal from gate 52, if present, is applied as one input to an AND gate 60, and the M signal is applied to its other input; thus, the M signal is applied as one input to the OR gate 40 and is the chrominance output signal at terminal 62 for the first described video input signal condition. If, however, there is a positive output from NOR gate 50, but no signal from comparator 58 to trigger AND gate 52, indicating that M is not purely a chrominance signal, no chrominance signal at all is processed to output terminal 62. Thus, the logic thus far described provides the M signal as one choice for the chrominance output under an input signal condition where $|T| \neq |M| \neq |B|$ and the inequality is due to a vertical chrominance transition, or no chrominance signal if the inequality is due to a luminance transition.

Another choice is provided by applying the outputs of comparators 46 and 48 as inputs to an AND gate 64, the output of which is applied as a second input to AND gate 36. If $||M|-|B||$ and $||M|-|T||$ are both less than R, indicating that the chrominance or the luminance on the television lines being combined are reasonably constant, the output of AND gate 64 is "high" and selects for the combed chrominance output signal, by triggering of AND gate 36, the signal $\frac{1}{2}[M - \frac{1}{2}(B+T)]$ appearing on line 32, this being the preferred algorithm for this signal condition.

If the output of AND gate 64 is "low" (so as not to trigger AND gate 36), an inverter 66 to which the output is also applied will produce a "high" signal at its output terminal, which signal is applied as a first input to each of two additional AND gates 68 and 70. The output from comparator 46 is applied as a second input to gate 68 and the output from comparator 48 is applied as a second input to gate 70. If the output from comparator 46 is "high", indicative that $||M|-|B||$ is greater than R, the output of AND gate 68 will be "high" and will trigger AND gate 36 to select the signal $\frac{1}{2}(M-B)$ on line 24 as the chrominance signal for transfer through OR gate 40 to output terminal 62. Conversely, if the output from comparator 48 is "high", indicative that $||M|-|T||$ is greater than R, the output of gate 70 will be "high" and will trigger AND gate 38 to select the signal $\frac{1}{2}(M-T)$ on line 26 as the chrominance signal to be transferred to the output terminal 62.

It will now be evident that the described system is automatically adaptive to the condition of the input video signal to select as the chrominance signal to be coupled to output terminal 62 one of the following: (1) the M signal, (2) $\frac{1}{2}[M - \frac{1}{2}(B+T)]$, (3) $\frac{1}{2}(M-B)$, (4) $\frac{1}{2}(M-T)$, or (5) no chrominance signal, thereby to minimize transient distortions which would otherwise be caused by luminance or color transitions in the vertical direction. The combed luminance output is obtained at an output terminal 72 by subtracting the chrominance output appearing at terminal 62, using a suitable subtracting circuit 74, from the delay equalized composite video signal delayed by one horizontal line by a delay line 76. Thus, the combed luminance output signal changes according to the selected chrominance signal and for the chrominance signals listed in the preceding sentence becomes: (1) no luminance signal, (2) $\frac{1}{2}[M+\frac{1}{2}(B+T)]$, (3) $\frac{1}{2}(M-B)$, (4) $\frac{1}{2}(M-T)$, or (5) the M signal. The combed luminance and chrominance output signals are thereafter processed in conventional ways known in the television art.

Depending upon its intended system use, the described adaptive comb filter can be implemented with all analog components, all digital components, or a combination of the two. Video processes such as addition, subtraction, switching, comparison and storage can better be done digitally, whereas gain-control and frequency filtering can be more easily performed with analog circuits. Thus, a hybrid digital-analog comb filter would afford the least circuit complexity, but if stability and reliability are of greater importance, the all-digital implementation is preferable. In either case, circuitry is known, in both the analog and digital domains, for accomplishing the described functions of the comb filter.

For example, in an analog implementation, the filter 10 may be conventional and designed to have a passband of approximately 2.1 MHz to 4.2 MHz, and the one-line delay lines 12, 14 and 76 may be the kind currently used in comb filters and other video processing systems. The circuits 42 and 44 may comprise full wave rectifiers to invert the signals whenever they are negative so as to derive their absolute values, and a subtractor, (e.g., a differential amplifier) for subtracting the absolute value signals. The output of the differential amplifier is applied to another full wave rectifier, and whenever the signal is negative, it is inverted. As has been indicated earlier, the comparators 46, 48 and 58 may be high gain differential amplifiers. The described AND, NOR and OR gates are, of course, well-known and may take any of many commercially available forms.

For a digital implementation it is necessary that the samples on the image plane be in vertical alignment for acceptable comb filtering. This may be realized in a pulse code modulation (PCM) system in which the encoding frequency $F_s$ is either four times the color subcarrier frequency $F_c$, or by using the $3F_c$ Phase Alternating Line Encoding technique described in U.S. Pat. No. 3,946,432 entitled "Apparatus for Digitally Encoding a Television Signal". The bandpass filter 10 may be of the type described in a paper entitled "Colour Demodulation of an NTSC Television Signal Using Digital Filtering Techniques" presented by A. G. Deczky at the International Conference on Communications held June 16-18, 1975 at San Francisco, Calif., and published in Volume II of the Conference Record distributed at the Conference.

Digital delay lines are known for producing the one-line delays, and may, for example, take the form of shift registers provided with clock signals synchronized to the master clock of the PCM video input signal. The circuits 42 and 44 may be arithmetic logic units arranged to provide their indicated functions, the implementation of which is conventional and well-known to ones skilled in digital processing systems. Although the system diagram, for clarity, shows single lines going to the AND gates, in the digital system each of the lines would consist of a plurality of parallel lines equal in number to the number of bits used to define each code word, all in accordance with known digital processing techniques. In a digital system which has been satisfactorily operated, emitter coupled logic (ECL) was used for all video signal processes because it meets all speed requirements with a large safety factor and lends itself to wired "OR" operations that significantly lower the gate count.

As in most adaptive processes, the effectiveness of the digital comb filter is strongly dependent on the source signal. In theory, the comb filter can perform extremely well with ideal television signals (i.e., signals with no noise, no distortions, no unbalanced color subcarrier, etc.), and in practice has been found to perform superbly with artificially generated, clean test signals. With such test signals, the setting of the threshold references R and R' is quite noncritical, and extremely good sensitivity can be achieved. However, with relatively noisy television pictures, subjective evaluation of performance is required to empirically determine optimum or satisfactory threshold setting for the comparators 46, 48 and 58. Settings that are optimum for a particular picture signal may not be satisfactory with a different picture signal. Accordingly, it is preferable that the reference setting R, which represents the maximum difference between the absolute value of the bandpassed M and T video or M and B video that is allowed before comb filtering involving M and T and/or M and B is disabled, be manually or automatically adjustable as a function of picture content. If R is too high, a comb filter will always be in the video path, and it will not adapt to the correct processing of low level vertical chrominance or luminance transitions. If R is too small, the comb filtering process will be disabled too often, possibly in response to noise; this may result in chroma crawl in the combed luminance signal and higher picture noise due to incorrect adaptive switching. It has been found that a reference setting of 35–70 mv., in a system designed to process a one volt peak-to-peak signal, provides generally acceptable performance with most pictures.

A separate, somewhat lower, reference level R' is needed for chrominance/luminance detection on line M. It being very rare in practice that a single TV line is of a particular color, it follows that if the signal on line M differs substantially from the signal on lines B and T, then most likely M is a luminance transition. Since the erroneous detection of a luminance transition on line M as a chrominance transition results in serious picture impairment, the threshold for chrominance detection is set very low.

An important parameter in a digital adaptive comb filter is the time response to the adaptive correction. Bearing in mind that M, T and B represent sampled, bipolar bandpassed signals, if M contains chrominance that happened to be sampled at a zero crossover of $F_c$, the color subcarrier, and this sample is then compared with a sample from T or B which may have no chrominance information at all (i.e., zero value), the difference between M and T or B will be within the reference level calling for the introduction of comb filtering. On the next clock pulse, however, that chrominance signal on M will be sampled at a higher level, possibly exceeding the threshold reference, thus removing the comb filtering process. Therefore, video distortion may result if comb filter adaptation is performed on an instantaneous basis, i.e., every clock pulse. The solution to this potential problem is not to insert the applicable comb filter into the signal path unless the associated comparator or comparators indicate that the threshold reference is not exceeded for at least a few clock pulses. In a digital system that has been successfully operated, $||M|-|\cdot T||$ must be less than R and/or $||M|-|B||$ must be less than R for two consecutive pulses before comb filtering is performed. However, once a specific comb filter is used, subjectively better picture quality is obtained if that filter is retained for at least four or five clock pulses after the associated comparator determines that the reference R has been exceeded and that specific comb filter is not suitable. This prevents turning off a comb filter by some relatively large noise spike, and also helps remove chroma crawl from diagonal color picture edges.

I claim:

1. An adaptive comb filter system for separating the luminance and chrominance components of an input composite NTSC television information signal, comprising, in combination:
    bandpass filter means connected to receive said input composite television signal and operative to pass a band of frequencies including the chrominance components and high frequency luminance components of the signal,
    means for separating the bandpassed video signal into a main (M) line component and adjacent top (T) and bottom (B) line components,
    an output terminal,
    means for deriving from said main line component (M) and said adjacent line components (B) and (T) four possible choices for the chrominance component of said television signal to be coupled to said output terminal, said choices being $\frac{1}{2}[M - \frac{1}{2}(B+T)]$, $\frac{1}{2}(M-B)$, $\frac{1}{2}(M-T)$, or $M$, and
    logic means operative in response to luminance or chrominance transitions in the vertical direction in the bandpassed video signal for coupling to said output terminal as the chrominance output the one of said four choices, or no chrominance signal, that most minimizes transient distortions in the television picture reconstructed from said television signal.

2. Apparatus according to claim 1, wherein said filter means has a passband of about 2.1 MHz to 4.2 MHz.

3. Apparatus according to claim 1, further comprising,
    means connected to receive and for delaying said input composite television signal by the period of one horizontal television line plus the delay of said filter means, and
    means for subtracting the combed chrominance component appearing at said output terminal from the delayed composite television signal for deriving the combed luminance component of said composite television signal.

4. Apparatus according to claim 1, wherein said separating means comprises:
    means for delaying the bandpassed video signal by the period of one horizontal television line for producing said main (M) line component,
    means for delaying the bandpassed video signal by the period of two horizontal television lines for producing said top (T) line component, and
    wherein said bandpassed video signal is said bottom (B) line component.

5. Apparatus according to claim 4, wherein said deriving means comprises,
    means for subtracting said bottom (B) line component from said main (M) line component and for dividing the resulting difference signal by two for producing a first signal $\frac{1}{2}(M-B)$,
    means for subtracting said top (T) line component from said main (M) line component and for dividing the resultant difference signal by two for producing a second signal $\frac{1}{2}(M-T)$, and
    means for adding said first and second signals and for dividing the resultant sum signal by two for producing a third signal $\frac{1}{2}[M - \frac{1}{2}(B+T)]$.

6. Apparatus according to claim 5, wherein said logic means includes
    means for subtracting the absolute value of said bottom (B) line component from the absolute value of said main (M) line component for producing a first difference signal,
    means for subtracting the absolute value of said top (T) line component from the absolute value of said main (M) line component for producing a second difference signal,
    means for comparing the absolute values of each of said first and second difference signals with a reference signal of predetermined magnitude and for producing gating control signals in response to said comparison,
    first gating means operative in response to a gating signal produced when the comparison shows the signal content of the bottom (B) line and top (T) line components to each be approximately equal to the signal content of the main (M) line component to couple to said output terminal as the combed chrominance output the signal $\frac{1}{2}[M - \frac{1}{2}(B+T)]$,
    second gating means operative in response to a gating signal produced when the comparison shows the signal content of the top (T) and main (M) line components to be approximately equal to each other but not approximately equal to the signal content of the bottom (B) line component to couple to said output terminal as the combed chrominance output the signal $\frac{1}{2}(M-T)$,
    third gating means operative in response to a gating signal produced when the comparison shows the signal content of the main (M) and bottom (B) line components to be approximately equal to each other but not approximately equal to the signal content of the top (T) line component to couple to said output terminal as the combed chrominance output the signal $\frac{1}{2}(M-B)$, and
    fourth gating means operative in response to a gating signal produced when the comparison shows that the signal content is different in all three of the top (T), main (M) and bottom (B) line components and a gating signal indicative that the main (M) line component is a chrominance signal to couple to said output terminal as the chrominance output the signal M, and operative when the last-mentioned gating signal is indicative that the main (M) line component is a luminance signal to couple no signal to said output terminal.

7. Apparatus according to claim 6, wherein said fourth gating means includes
    means connected to receive said main (M) line component and operative to derive a signal representative of the absolute difference between said main (M) line component and said main (M) line component delayed by one period of the color subcarrier of said composite television signal, and means for comparing said absolute difference signal with a reference signal of predetermined magnitude and operative to produce a gating signal when said main (M) line component is a chrominance signal and not to produce a gating signal when said main (M) line component is a luminance signal.

* * * * *